United States Patent [19]

Kozu et al.

[11] 3,810,239

[45] May 7, 1974

[54] AUTOMATIC CASSETTE CHANGER

[75] Inventors: Isao Kozu; Hidetoshi Kurihara; Tetsuo Hino, all of Osaka, Japan

[73] Assignee: Natsushita Electric Industrial Co. Ltd., Osaka, Japan

[22] Filed: Sept. 19, 1972

[21] Appl. No.: 291,363

Related U.S. Application Data

[62] Division of Ser. No. 140,761, May 6, 1971.

[30] Foreign Application Priority Data

May 6, 1970 Japan ........................ 45-38780

[52] U.S. Cl. ........................ 360/92

[51] Int. Cl. ........................ G11b 5/00

[58] Field of Search ........ 274/4 F, 10 D; 340/162; 353/15

[56] References Cited

UNITED STATES PATENTS

| | | | |
|---|---|---|---|
| 3,408,139 | 10/1968 | Schwartz et al. | 353/15 |
| 3,511,508 | 5/1970 | Ban | 274/4 F |
| 3,617,066 | 11/1971 | Foelkel et al. | 274/4 F |
| 3,677,555 | 7/1972 | Vail et al. | 274/4 F |
| 3,643,962 | 2/1972 | White et al. | 274/4 F |

*Primary Examiner*—Leonard D. Christian
*Attorney, Agent, or Firm*—Wenderoth, Lind & Ponack

[57] ABSTRACT

An automatic cassette changer has a rotary tray for storing a plurality of cassettes, a tape deck for playback of the cassettes, and tray driving means for rotating the rotary tray. Index means is provided for restricting the rotation of the rotary tray so as to position a selected single cassette at a first position. Cassette exchanging means transports the single cassette from the first position to an operative position to engage the single cassette with the tape deck. A motor drives the tray driving means and the cassette exchanging means, and clutch means is provided which is responsive to the index means upon restriction of the rotary tray by the index means so as to disengage the motor from the tray driving means and to couple the motor with the cassette exchanging means.

8 Claims, 18 Drawing Figures

AUTOMATIC CASSETTE CHANGER

This is a division of application Ser. No. 140,761 filed May 6, 1971.

This invention relates to an automatic cassette changer, and more particularly to a cassette changer capable of successively and selectively playing back a plurality of cassettes automatically.

One well known apparatus for selective playback of music is a juke box in which a plurality of disc records are used. However, such a conventional apparatus has a complex construction and is quite expensive so that it is only used in coffee shops and restaurants for commercial purposes. Recently, cassettes and endless-tape cartridges having music recorded thereon have become readily available in the market. It is desired to develop an automatic changer for such cassettes for home use which is inexpensive to produce and easy to operate.

The general object of the present invention is to provide a new and improved cassette changer capable of successively and selectively engaging a plurality of cassettes from a rotary tray with the tape deck.

Another object of the present invention is to provide an improved cassette changer having novel clutch means through which the driving force of the motor is transmitted to tray driving means and cassette exchanging means.

Still another object of the present invention is to provide an improved cassette changer having novel cassette exchanging means which includes an elevator movable up and down to transport the single cassette from the rotary tray to a position facing the tape deck.

Still another object of the present invention is to provide an improved cassette changer wherein a compartment in the rotary tray skips over the opening for introducing the cassette into the tape deck, if a cassette is not stored in said compartment.

Still another object of the present invention is to provide an improved cassette changer having novel control circuits which include unique memory devices for memorizing instructions to play back the cassettes successively and endlessly.

Still another object of the present invention is to provide an improved cassette changer having novel control circuits which include unique memory devices for memorizing instructions to play back the cassettes in a selected order.

These objects are achieved by providing an automatic cassette changer according to the present invention which comprises a chassis, a rotary tray which is rotatably mounted on said chassis and is provided with a plurality of compartments for storing a plurality of cassettes respectively, a tape deck which is mounted on said chassis and includes a magnetic head and tape moving elements for playback of said cassettes, tray driving means for rotating said rotary tray to transfer said cassettes in a circular path, index means for restricting the rotation of said rotary tray so as to position a selected compartment of said rotary tray at a first position from which a single cassette in said selected compartment can be moved toward said tape deck, cassette exchanging means for transporting said single cassette from said first position to an operative position to engage said single cassette with said tape deck so that said single cassette is played back by said magnetic head, a motor for driving said tray driving means and said cassette exchanging means, and clutch means responsive to said index means upon restriction of said rotary tray by said index means so as to disengage said motor from said tray driving means and to couple the motor with said cassette exchanging means so that said single cassette is transported from said first position to said operative position by said cassette exchanging means.

Said cassette changer can be controlled by control circuits which comprise a plurality of first memory devices, each of which corresponds to one of said compartments of said rotary tray to memorize instructions to play back a single cassette in the corresponding compartment, a plurality of selection devices each of which corresponds to one of said first memory devices and which is capable of setting said first memory devices selectively to memorize said instructions, control means for controlling said tray driving means and said index means so that said tray driving means rotates said rotary tray and said index means restricts the rotation of said rotary tray so as to bring the single cassette in the compartment corresponding to the set first memory device to said first position when at least one of said first memory devices is set by the corresponding selection device, and resetting means for resetting the set first memory device corresponding to the played single cassette in every exchanging cycle of said cassette exchanging means.

Said cassette changer also can be controlled by another group of control circuits which comprise a plurality of first memory devices, each of which corresponds to one of said compartments of said rotary tray to memorize instructions to play back a single cassette in the corresponding compartment, a plurality of selection devices, each of which corresponds to one of said first memory devices and which is capable of setting said first memory devices selectively to memorize said instructions, a plurality of second memory devices for memorizing the order in which said first memory devices are selected, each of said second memory devices being controlled by switching of a memory step switch in every exchanging cycle of said cassette exchanging means so as to allow only one of the set first memory devices corresponding to the number memorized by the second memory device to initiate said index means, and control means for controlling said tray driving means and said index means so that said tray driving means rotates said rotary tray and said index means restricts the rotation of said rotary tray so as to bring the single cassette in the compartment corresponding to the set first memory device to said first position when at least one of said first and second memory devices is set by the corresponding selection device whereby said cassettes are played back in the order in which said first memory devices are selected.

Further objects and advantages will become apparent from the following detailed description taken in connection with the accompanying drawings, in which.

Figure 1:
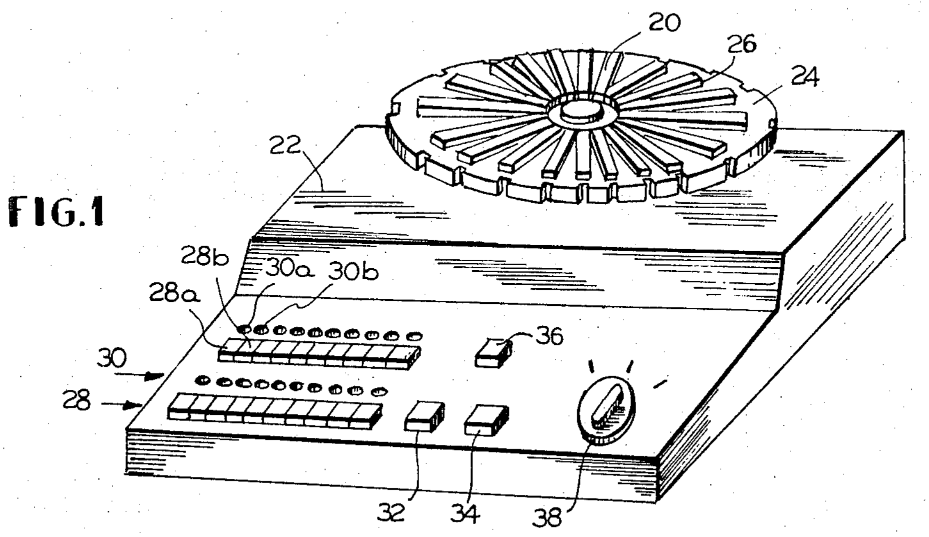
FIG. 1 is a perspective view of an automatic cassette charger embodying the invention.

Referring now to the drawings, there will be explained one embodiment of an automatic cassette changer according to the present invention.

Figure 12:
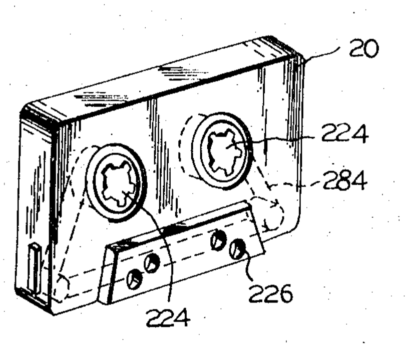
FIG. 12 is a perspective view of a cassette used in this automatic cassette changer.

This automatic cassette changer is constructed so as to be useful for handling a reel-to-reel type cartridge, expecially a cassette as shown in FIG. 12. However, the present invention is not limited to use only for a cassette as shown in FIG. 12, but it is also useful for another type of cartridge, such as an endless tape cartridge.

With reference to FIG. 1, a plurality of cassettes 20 are stored in a plurality of radially extending compartments 26 which are provided in a rotary tray 24 rotatably mounted on a cabinet 22. On a panel surface of said cabinet 22 there are provided rows 28 of a plurality of selection buttons 28*a*, 28*b*. . .as selection devices and rows 30 of plurality of indicating lamps 30*a*, 30*b*. . .which correspond to said compartments 26, respectively. For the purpose of control of this cassette changer there are also provided on the panel surface of the cabinet 22 a reject button 32, a stop button 34, a simultaneous setting button 36 for setting the first memory devices, and a switch knob 38 for switching the playback mode of the cassette changer.

Figure 2:
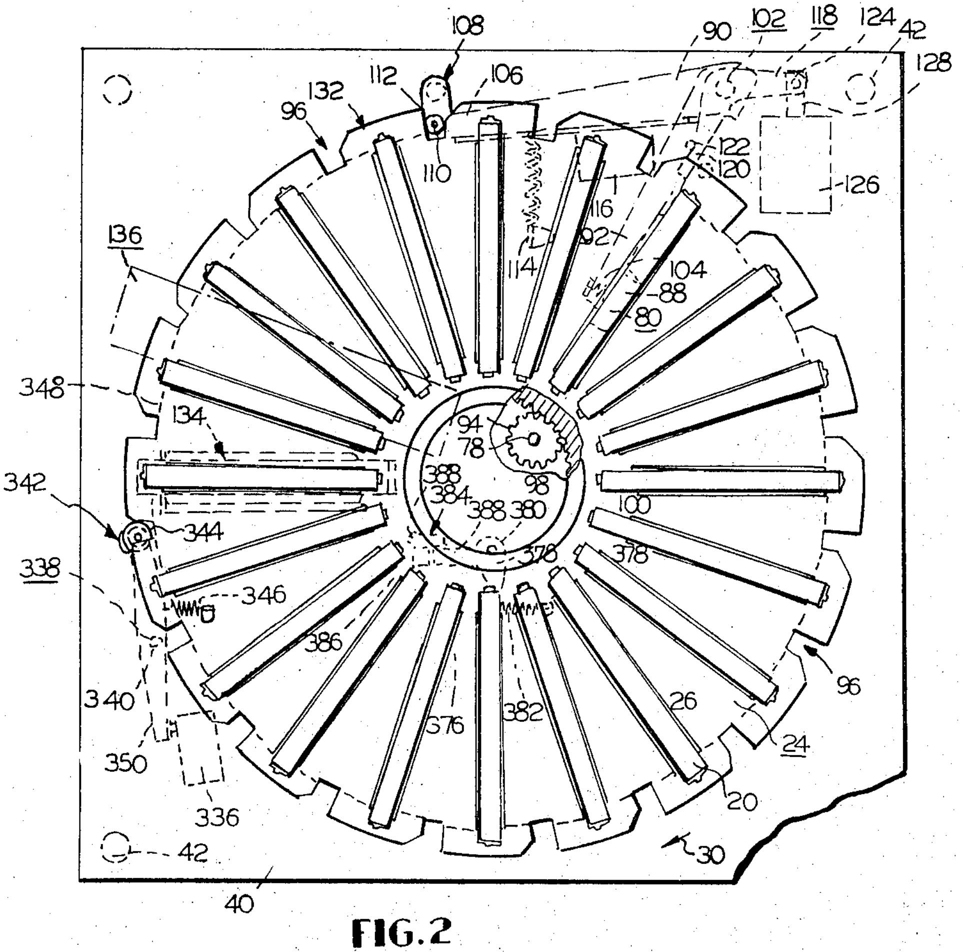
FIG. 2 is a top plan view of the automatic cassette changer of FIG. 1 with the cabinet removed for clarity.
Figure 3:
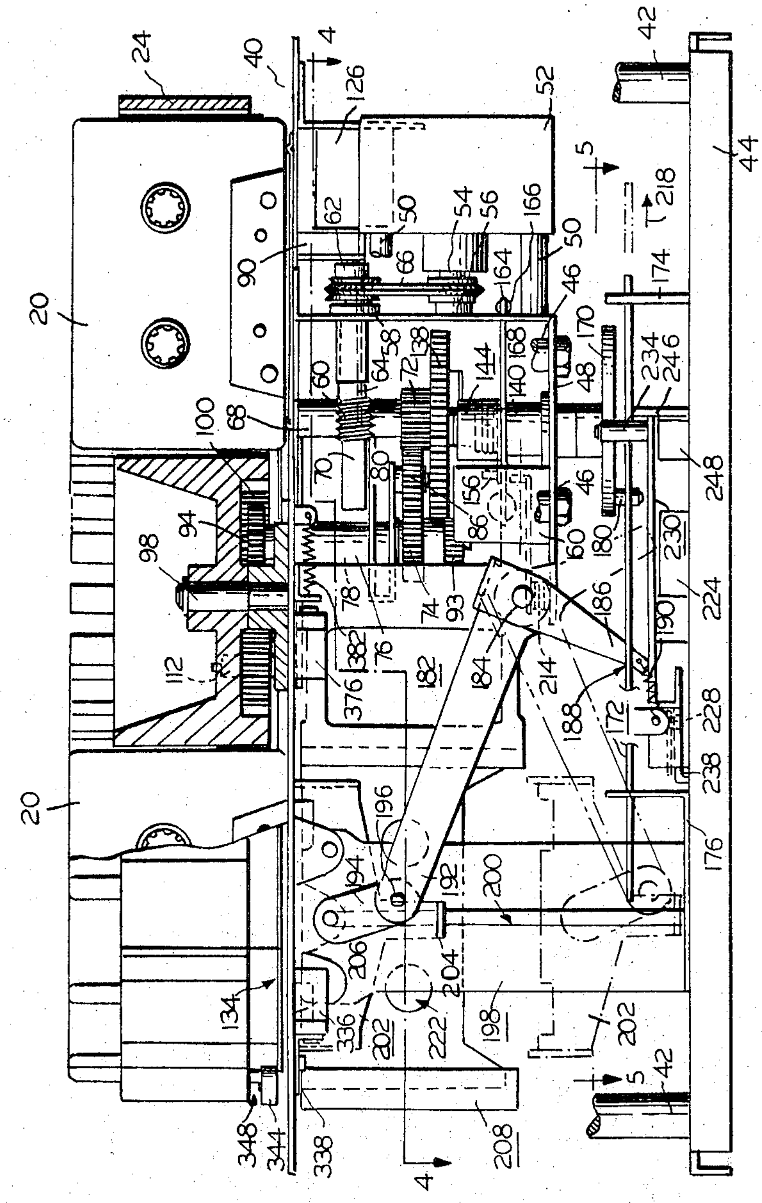
FIG. 3 is a side view of the automatic cassette changer of FIG. 2 with certain parts broken away to provide a clear illustration.

Referring to FIGS. 2 and 3, an upper chassis 40 is secured to a lower chassis 44 by stay rods 42, and a middle chassis 48 is fixedly suspended from upper chassis 40 by stay rods 46. A motor 52 is attached to an upstanding portion of said middle chassis 48 by two support poles 50. Said motor 52 has a pulley 56 secured to an output shaft 54 thereof. A worm 60 formed at one end of a shaft 64 is rotatably journalled in a bearing 58 which is attached to the upstanding portion of said middle chassis 48. A pulley 62 is fixed at the other end of said shaft 64. A belt 66 is disposed around said pulley 56 and said pulley 62 so that said motor 52 drives said worm 60 through said belt 66.

Figure 4:
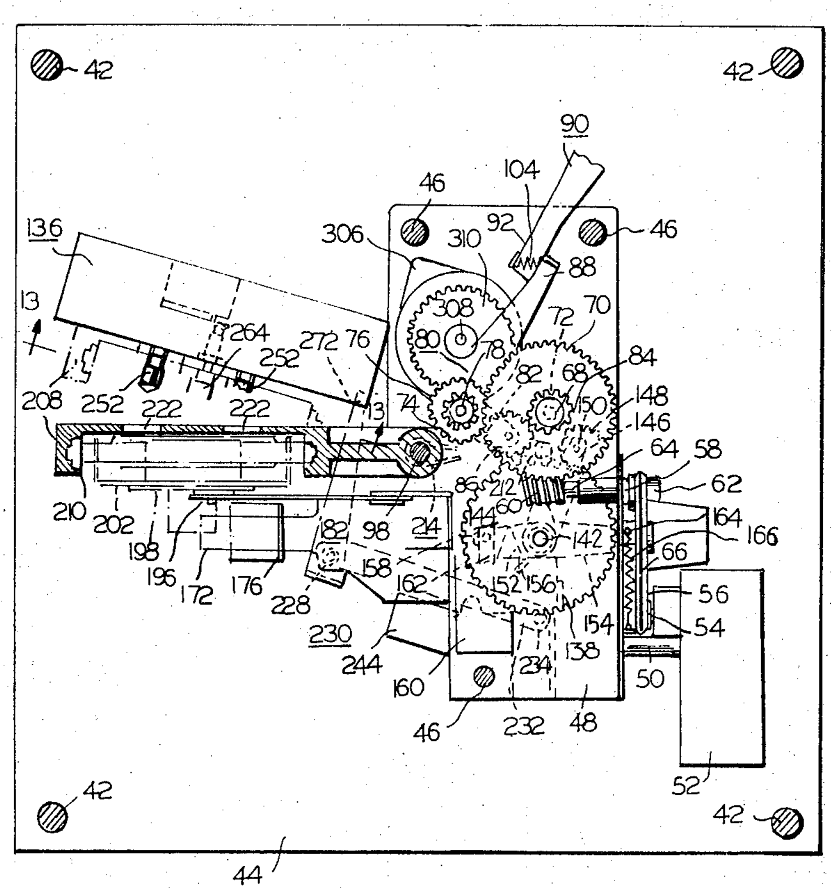
FIG. 4 is a sectional view taken substantially along the irregular line 4—4 in FIG. 3.

Referring to FIGS. 3 and 4, a worm wheel 70 and a gear 72 integral with said worm wheel 70 are rotatably mounted on a shaft 68 which is fixedly attached to the lower surface of the upper chassis 40. Said worm wheel 70 meshes with the worm 60. The driving force of said motor 52 is transmitted to a tray driving means through a clutch means which will be described hereinafter. A gear 74 is fixed to a shaft 78 rotatably supported in a bearing 76 which is permanently affixed to the upper chassis 40, an L-shaped lever 80 (see also FIG. 9) is swingably mounted on the bearing 76 and a gear 86 is rotatably supported on a shaft 84 which is secured to one end 82 of said lever 80. The other end 88 of said lever 80 is engageable with an end 92 of an L-shaped lever 90 which will be described later.

Figures 9, 10:
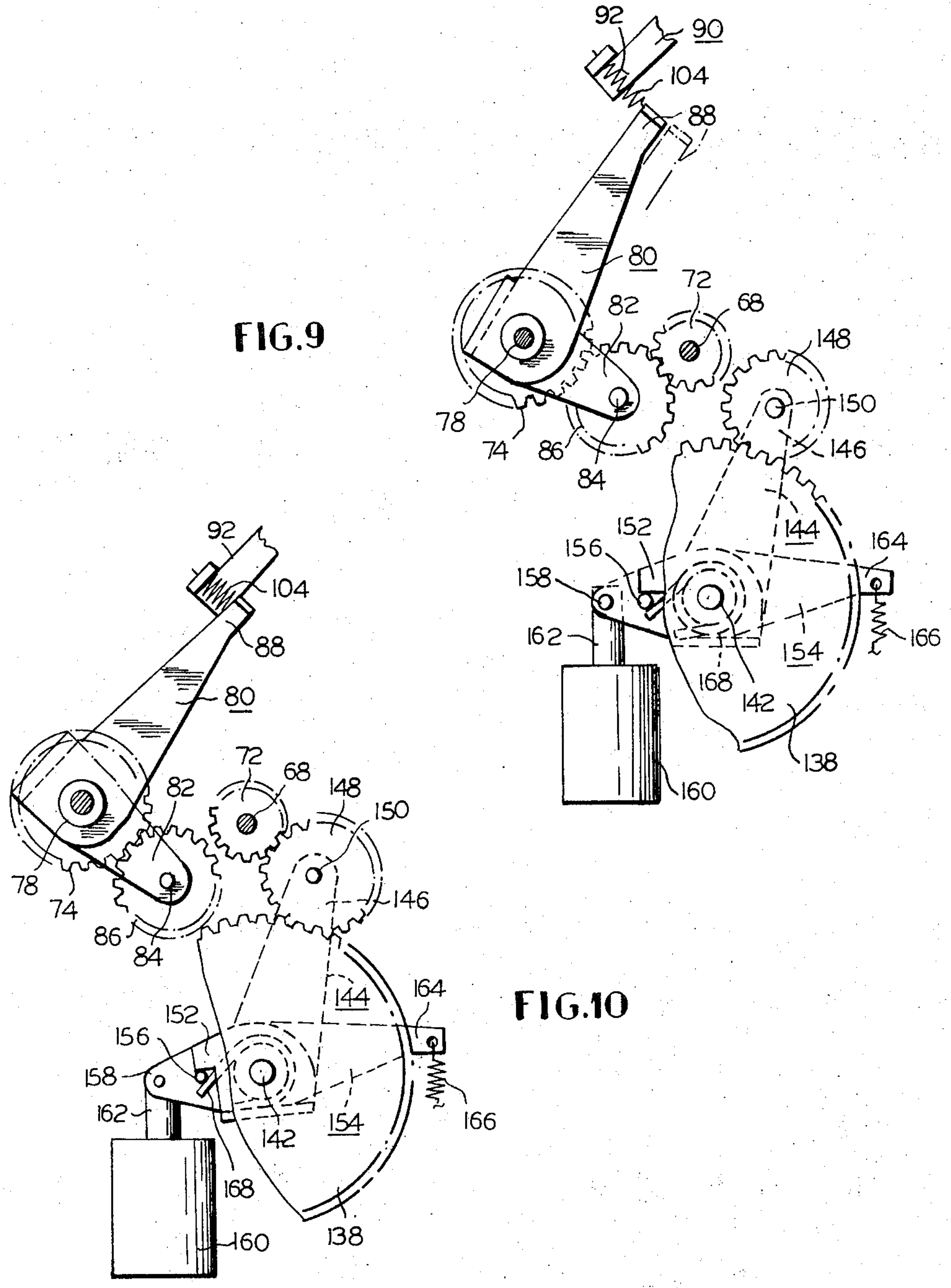
FIGS. 9 and 10 are fragmentary plan views of clutch means used in this automatic cassette changer.

Said gear 86 is constantly in mesh with the gear 74, and is brought into mesh with the gear 72 when the lever 80 swings counterclockwise about the shaft 78 as shown in FIG. 9, Upon rotation of the motor 52, said worm wheel 70 is rotated clockwise by the worm 60 so that the shaft 78 rotates clockwise through the gear 74 when the gear 86 is meshed with the gear 72. As shown in FIG. 3, said shaft 78 has a gear 93 secured to the lower end thereof, and has a pinion 94 secured to the upper end thereof. Said gear 93 and said pinion 94 rotate together with the gear 74.

Referring to FIGS. 2 and 3, the rotary tray 24 has a plurality of recesses 96 at the periphery thereof, each of which corresponds to one of the compartments 26. Said rotary tray 24 is rotatably mounted on a shaft 98 which is secured to the upper surface of the upper chassis 40. The rotary tray 24 has an internal gear 100 formed at a central portion thereon which meshes with the pinion 94. Said rotary tray 24 is restricted in its rotation by index means which will be described hereinafter. The lever 90 is pivotally mounted on a shaft 102 which is secured to the upper chassis 40. The end 92 of the lever 90 is pressed against the end 88 of the lever 80 by a tension spring 104. The other end 106 of the lever 90 has a shaft 110 fixed thereto which extends upwardly through an opening 108 in the upper chassis 40 and which has a roller 112 rotatably mounted thereon. When this cassette changer is in the stopped state, the roller 112 is forced into one of the recesses 96 in the rotary tray 24 under the biasing force of a tension spring 114 which is attached to said lever 90, as shown in FIG. 2, and said lever 90 actuates a micro switch 116. An L-shaped lever 118 is pivotally mounted on the shaft 102. One end 120 of said lever 118 is engageable with a pin 122 on the lever 90, and the other end 124 of said lever 118 is linked to a plunger 128 of a solenoid 126 which is attached to the upper chassis 40. Said lever 90, said lever 118 and said solenoid 126 constitute index means for restricting the rotation of the rotary tray 24. Upon energization of the solenoid 126 the plunger 128 pulls the lever 118 to swing it clockwise. The end 120 of said lever 118 pushes the pin 122 to swing the lever 90 in the same direction. Therefore, the roller 112 is swung out of engagement with the recess 96 of the rotary tray 24 so that the restriction on the movement of the rotary tray 24 is released. At the same time, the end 92 of the lever 90 swings the lever 80 in FIG. 4 counterclockwise through the tension spring 104. Accordingly, as shown in FIG. 9, the gear 86 meshes with the gear 72 under the biasing force of said tension spring 104. Since the gear 72 rotates clockwise according to the rotation of the motor 52 as stated above, the pinion 94 transmits rotation force from the gear 72 and drives the rotary tray 24 in the direction of the arrow 130 in FIG. 2. When the solenoid 126 is deenergized during the rotation of the rotary tray 24, the lever 90 is swung counterclockwise by the tension spring 114 so that the roller 112 is pressed against outer periphery 132 of the rotary tray 24. When one of the cassettes 20 is brought to a first position where the cassette 20 is positioned just above an opening 134 which is provided in the upper chassis 40, one of the recesses 96 of the rotary tray 24 is opposite the roller 112 so that the roller 112 drops into the recess 96 to restrict the rotation of the rotary tray 24. On the other hand, with the swinging motion of the lever 90, the lever 80 swings clockwise about the shaft 78 to disengage the gear 86 from the gear 72 as shown in FIG. 10. Therefore, the rotary tray 24 is disengaged from the motor 52.

A tape deck 136 is provided under the upper chassis 40 as shown in FIGS. 2 and 4. Upon restriction of the movement of the rotary tray 24 by the index means, a single cassette 20 at the first position is transported from the rotary tray 24 through the opening 134 of the upper chassis 40 toward the tape deck 136 by cassette exchanging means which is driven by the motor 52 through a clutch means which will be described in detail hereinafter.

With reference to FIGS. 3, 4 and 9, a gear 138 is fixed to a shaft 142 which is rotatably supported in a bearing 140 secured to the middle chassis 48. A gear 148 is rotatably supported on a shaft 150 fixed to one end 146 of an L-shaped lever 144 which is pivotally mounted around said bearing 140. The other end 152 of said lever 144 is engaged with a pin 156 secured to a lever 154 which is pivotally mounted on said bearing 140. One end 158 of the lever 154 is linked with a plunger 162 of a solenoid 160, and the other end 164 of the lever 154 is provided with a tension spring 166. The end 152 of the lever 144 is pressed against the pin 156 by a torsion spring 168 which is provided between the lever 144 and the lever 154. The gear 148 meshes with the gear 138 and can rotate along the periphery of said gear 138 according to the counterclockwise swing motion of the lever 144 so as to mesh with the gear 72. When this cassette changer is stopped, said gear 148 is not meshed with the gear 72, as shown in FIG. 9.

Upon energization of the solenoid 160, the plunger 162 swings the lever 154 counterclockwise about the shaft 142 so that the pin 156 pushes one end of the torsion spring 168. Through said torsion spring 168, the lever 144 swings counterclockwise to move the gear 148 into mesh with the gear 72, as shown in FIG. 10. Since the gear 72 is rotating clockwise according to the rotation of the motor 52 as stated above, the rotating force of the gear 72 is transmitted to the shaft 142 through the gears 148 and 138.

Figure 5:
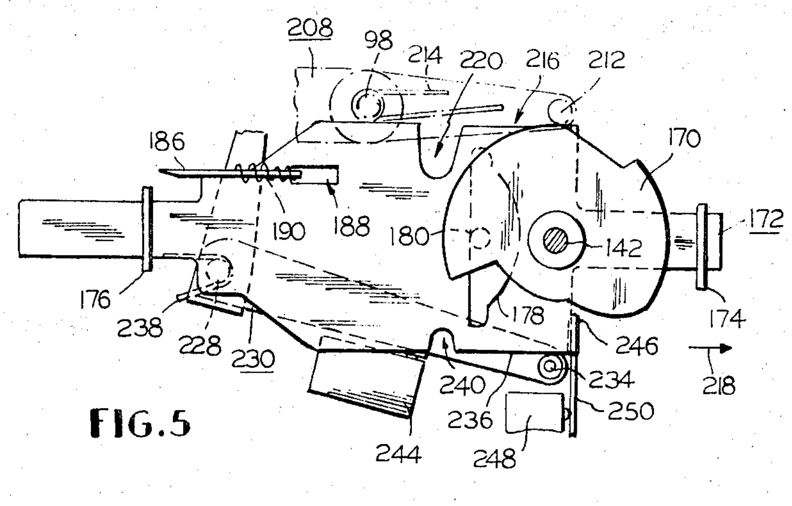
FIGS. 5–8 are fragmentary sectional views of a part of the changer taken along the line 5—5 of FIG. 3 showing the parts in different positions.

As shown in FIGS. 3 and 5, a cam 170 is fixed to a lower portion of said shaft 142. A slide plate 172 is slidably mounted on the lower chassis 44 for movement in guide members 174 and 176 which are attached to the lower chassis 44. A pin 180 affixed to the lower surface of said cam 170 is inserted into a cam slot 178 which is provided in the central portion of the slide plate 172. On the other hand, an L-shaped lever 182 is pivotally mounted on a horizontal shaft 184 which is fixed to the middle chassis 48. One end 186 of said lever 182 extends downward through an opening 188 in the slide plate 172 and is tensioned by a tension spring 190 which is connected between the slide plate 172 and said end 186. The other end 192 of said lever 182 is linked with a connecting plate 194 by a pin 196. An elevator 202 is linked with said connecting plate 194 by a pin 196. An elevator 202 is linked with said connecting plate 194 by a pin 206. Said pin 206 and a bent tab 204 extend into an elongated vertical slot 200 formed in a guide plate 198 which is fixedly mounted between the upper chassis 40 and the lower chassis 44. Accordingly, upon swinging motion of the lever 182, the elevator 202 moves up and down.

When this cassette changer is stopped, said elevator 202 is in the uppermost position of its stroke, as shown in FIG. 3, so that the cassette 20 in the first position just above the opening 134 is supported by said elevator 202.

Referring to FIGS. 3 and 4, a holder 208 is pivotally mounted on a lower portion of the shaft 98, on which the rotary tray 24 is rotatably mounted. Said holder 208 is provided with a compartment 210 for receiving the single cassette 20 and a rotatable roller 212, and is biased clockwise in FIG. 4 about the shaft 98 by a torsion spring 214. When this cassette changer is stopped, the roller 212 is engaged with a side edge portion 216 of the slide plate 172 and the outer profile of the cam 170, as shown in FIG. 5. In this state, the compartment 210 of the holder 208 is in a second position just under the opening 134 so that the single cassette 20 can pass through said opening between the rotary tray 24 and the holder 208.

Figure 15:
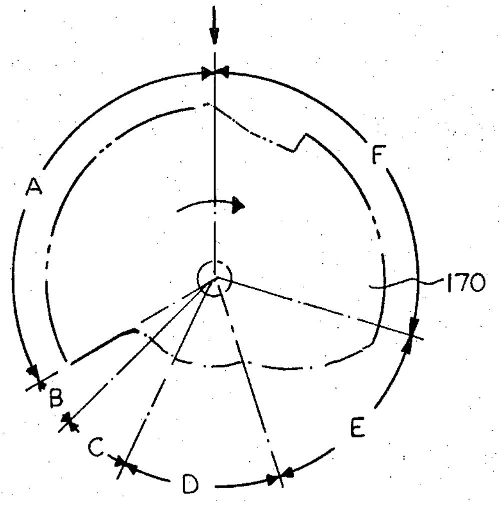
FIG. 15 is a diagrammatic view of a cam of the cassette exchanging means used in this automatic cassette changer.

When the shaft 142 starts to rotate clockwise from the position in FIG. 5 and the cam 170 rotates through the A-phase as shown in FIG. 15, the slide plate 172 moves in the direction of the arrow 218 during the rotation of the pin 180 so as to swing the lever 182 counterclockwise (in FIG. 3) about the shaft 184. Therefore, the elevator 202 starts to move downward and occupies a position indicated by dot-dash lines, as shown in FIG. 3, so that the single cassette 20 on the elevator 202 passes through the opening 134 in the upper chassis 40 and is supported by the compartment 210 of the holder 208 at the second position where said single cassette 20 faces said tape deck 136.

Figure 6:
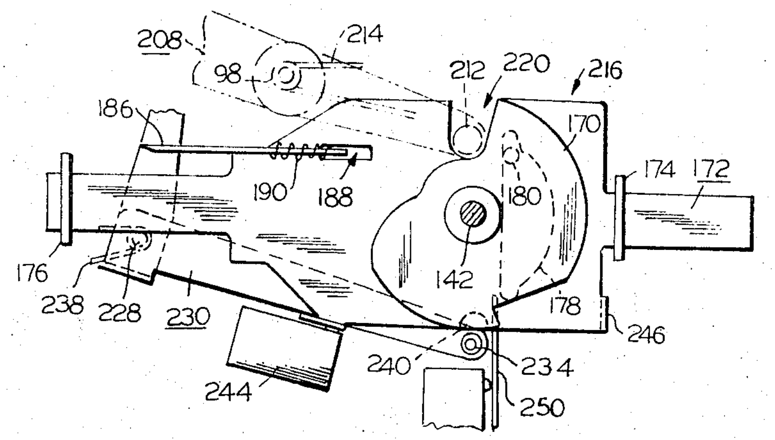

During B-phase rotation of the cam 170, as shown in FIG. 15, the roller 212 on the holder 208 drops into a cutaway portion 220 of the slide plate 172 upon the movement of the slide plate 172 as shown in FIG. 6. The holder 208 swings clockwise about the shaft 98 under the biasing force of the torsion spring 214. Accordingly, the compartment 210 of the holder 208 is pressed against the tape deck 136 as indicated by dot-dash lines in FIG. 4 so that the single cassette 20 is shifted to an operative position to engage with the tape deck 136. Tape moving elements, such as a capstan and reel shafts which will be described in detail later, are inserted into corresponding holes of the single cassette 30 (see FIG. 12), through opening 222 in the compartment 210. Thus, the engagement of the single cassette 20 with the tape deck 136 is completely achieved.

Referring to FIGS. 3 and 4, a lever 230 is pivotally mounted on a shaft 228 which is secured to the lower chassis 44. One end 232 of said lever 230 is provided with a roller 234 which is pressed against a side edge portion 236 of the slide plate 172 by a torsion spring 238 as shown in FIG. 5. When the cam 170 rotates through the B-phase, as shown in FIG. 15, the roller 234 is opposite a cutaway portion 240 in the slide plate 172, but is prevented from dropping into the cutaway portion 240 by the outer profile of the cam 170.

With C-phase rotation of the cam 170, as shown in FIG. 15, a step portion 242 of the cam 170 is brought to a position facing the roller 234 so that the roller 234 drops into the cutaway portion 240 of the slide plate 172 by the torsion spring 238. Therefore, the lever 230 swings counterclockwise about the shaft 228 so as to operate the tape deck 136 in a manner which will be described in detail later.

Upon counterclockwise swinging motion of the lever 230, said lever 230 switches a switch 244 provided on the lower chassis 44 so as to de-energize the solenoid 160 through control circuits which will be described in detail later. Accordingly, the gear 148 is disengaged from the gear 72, as shown in FIG. 9, so that the cassette exchanging means is disengaged from the motor 52. The cam 170 stops temporarily at the end of the C-phase rotation, while the single cassette 20 in the operative position is played back by the tape deck 136. Upon termination of playback of said single cassette 20, the solenoid 160 is energized again by the control circuits to initiate the cassette exchanging means. Such operation of the control circuits will be described in detail later.

Figure 8:
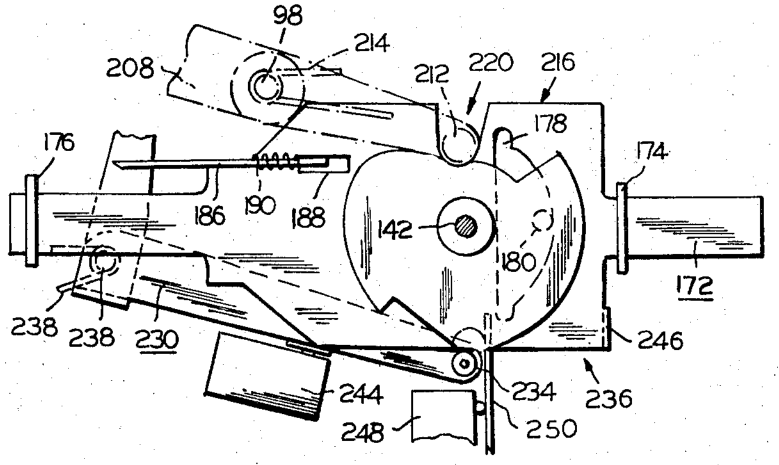

When the cam 170 rotates through the D-phase in FIG. 15, the outer profile of the cam 170 drives the roller 234 so as to swing the lever 230 clockwise, as shown in FIG. 8. When the cam 170 moves the roller 234 outside of the side edge portion of the slide plate 172, the lever 230 actuates the switch 244.

When the cam 170 rotates through the E-phase, as shown in FIG. 15, the outer profile of the cam 170 drives the roller 212 to swing the holder 208 counterclockwise from the position in FIG. 8. Then the cassette 20 is removed from the tape deck 136 and occupies the second position indicated by dot-dash lines in FIG. 4. While the cam 170 is rotating through the D-phase and the E-phase, the pin 180 of the cam 170 rotates along a circular portion of the cam slot 178 of the slide plate 172 so that said slide plate 172 does not move. Accordingly, the elevator 202 remains at its lowermost extremity until the single cassette 20 is returned from the operative position to the second position where said cassette 20 is positioned just above the elevator 202.

After the cam 170 has driven the roller 212 of the holder 208 outside of the side edge portion 216 of the slide plate 172, the cam 170 rotates through the F-phase, as shown in FIG. 15, and the pin 180 of the cam 170 moves the slide plate 172 in the opposite direction to the arrow 218. In FIG. 3, the lever 182 swings clockwise about the horizontal shaft 184 under the action of the spring 190 upon said movement of the slide plate 172 so that the elevator 202 moves upward carrying the cassette 20 thereon.

When the cam 170 terminates its one rotation and returns to the initial position, as shown in FIG. 5, the elevator 202 shifts the cassette 20 completely up to the first position above the upper chassis 40 so as to restore said cassette 20 to the compartment 26 of the rotary tray 24. When the slide plate 172 returns to its initial position, as shown in FIG. 5, a bent portion 246 of the slide plate 172 actuates an actuator 250 of a switch 248 so as to deenergize the solenoid 160 through the control circuits which will be described later. Accordingly, as shown in FIG. 9, the lever 154 rotates clockwise by means of the tension spring 166 so as to disengage the gear 148 from the gear 72. As a result, said cam 170 is disengaged from the motor 52.

Now the detailed construction of the tape deck will be described.

Figure 13:
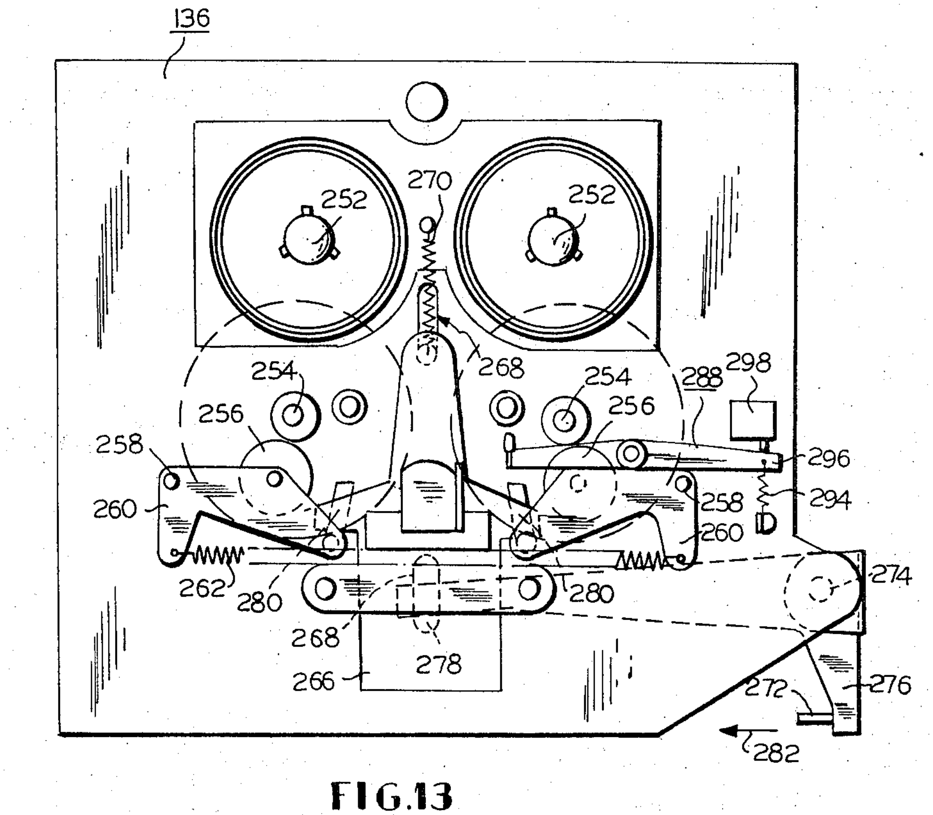
FIG. 13 is a sectional view of the tape deck taken along the line 13—13 of FIG. 4.

With reference to FIG. 13, the tape deck 136 is provided with tape moving elements such as two reel shafts 252, two capstans 254 and two pinch rollers 256. Said two capstans 254 are rotated in the same direction at a predetermined speed by a motor (not shown), and are also rotated in the opposite direction upon reversal of the rotation of said motor. The reel shaft 252 on the takeup side is driven through a friction drive mechanism which is widely known in the prior art. Said two pinch rollers 256 are rotatably mounted on pinch roller arms 260, respectively, which are pivotally mounted on shafts 258, respectively. Said arms 260 have a rotation force toward said capstans 254 imparted thereto by a tension spring 262. Since conventional means can be used for such tape moving elements, a detailed description of their specific construction is omitted here.

A slide member 266 on which a magnetic head 264 is supported is slidably mounted on the tape deck 136 and is guided by slots 268 for movement up and down. Said slide member 266 is biased upward by a tension spring 270. When this cassette changer is in the stopped state, one end 272 of the lever 230 swings a lever 276, which is pivotally mounted on a shaft 274 secured on the tape deck 136 counterclockwise, as shown in FIG. 13. The other end of said lever 276 depresses a pin 278 secured to the slide member 266 so that said slide member 266 is kept in a lowermost position. Protruding portions 280 swing pinch roller arms 260 so as to separate the pinch rollers 256 from the capstans 254. The magnetic head 264 is also positioned in a lowermost position with said slide member 266. Therefore, said pinch rollers 256 and said magnetic head 264 do not cause the engagement of the cassette 20 with the tape moving elements.

Referring to FIG. 4, after the single cassette 20 has been engaged with the tape deck 136, the lever 230 swings counterclockwise with the rotation of the cam 170 as stated above so that the end 272 of the lever 230 moves in the direction of the arrow 282 in FIG. 13. The slide member 266 moves upward under the force of the tension spring 270 so that the two pinch rollers 256 are pressed against the two capstans 254 by the tension spring 262 and the magnetic head 264 engages with a magnetic tape 284 in the cassette 20. The capstans 254 and the reel shafts 252 rotate in one direction by the rotation of the motor provided in the tape deck 136 so as to play back one side of the cassette 20.

It is desirable that the direction of tape movement be automatically reversed for the playback of the other track of the tape in the cassette after termination of the playback of one track of the tape. If the tape deck can play back only one track of the tape, the cassette must be turned over by hand for the playback of the other track of the tape. For this purpose, the direction of the rotation of the motor for the tape drive can be reversed upon detection of the tape end. For detecting of the tape end, a conventional method can be applied, such as the detection of a conductive foil adhered to the tape end, the detection of an increase in tape tension at the tape end, and so on.

Upon reversing of the motor, the capstans 254 and the reel shafts 252 begin to rotate in the reverse direction so that the magnetic tape 284 moves in the opposite direction. At the same time, the magnetic head 264 is switched to the other track of the tape 284 for the successive playback of the other track of the cassette 20.

Figure 14:
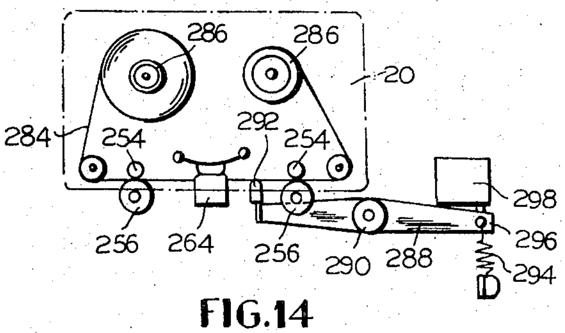
FIG. 14 is a fragmentary elevational view of a tape end detecting device used in this automatic cassette changer.

Since both tape ends are fixed to reel hubs 286, respectively, tape tension increases at the tape end after termination of the playback of the other track of the tape. The tape deck 136 is provided with a detecting lever 288, FIG. 14, for detecting said increase in tape tension. Said detecting lever 288 is pivotally mounted on a shaft 290 secured to the tape deck 136. A detecting edge 292 provided at one end of said lever 288 is biased clockwise by a tension spring 294 so as to engage with tape 284 in the cassette 20. When the tape tension increases, as shown in FIG. 14, said detecting lever 288 in swung counterclockwise by the tape 284 so that the other end 296 of the lever 288 actuates a switch 298 attached to the tape deck 136. Upon switching of said switch 298, the solenoid 160 is energized through the control circuits so as to couple the motor 52 with the cassette exchanging means. Upon rotation of the cam 170 through the D-phase, the lever 230 is swung clockwise (in FIG. 4) by the cam 170 so that the end 272 of said lever 230 moves in the opposite direction from the arrow 282 in FIG. 13. Therefore, the lever 230 swings counterclockwise to depress the slide member 266 downward so as to separate the pinch rollers 256 from the capstans 254. Then the cassette 20 is disengaged from the tape deck 136 and is restored to the compartment 26 of the rotary tray 24 by the cassette exchanging means, as described above.

The control circuits for controlling the operation of this cassette changer will be described with reference to FIG. 17.

Figure 11:
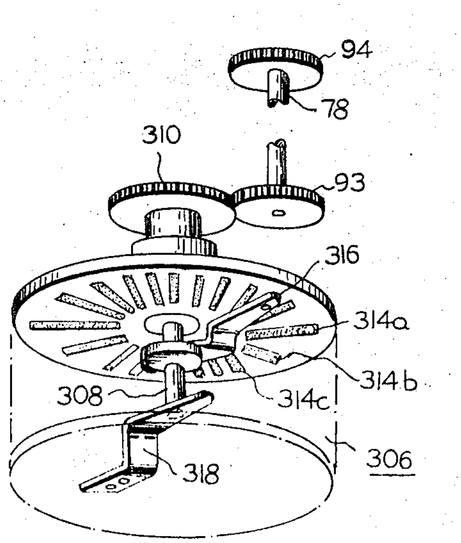
FIG. 11 is a perspective view of a tray rotary switch used in this automatic cassette changer.

First memory means is provided in order to memorize instructions to select a desired single cassette 20 from a plurality of cassettes in the rotary tray 24 and to play back said single cassette. Said first memory means consists of a plurality 300 of first memory devices 300*a*, 300*b*, 300*c*...each of which is composed of a flip-flop and corresponds to one of the compartments 26 of the rotary tray 24. This means that the number of first memory devices 300 is the same as the number of the cassettes 30 which can be stored in the rotary tray 24. An operator can set any one of the first memory devices 300 corresponding to the desired cassette by operation of selection devices. As such selection devices, this cassette changer is provided with a plurality 302 of selection switches which are operated by a plurality of selection buttons 28 as shown in FIG. 1, respectively. A plurality of indicating lamps 30 are connected to said first memory devices 300, respectively, to indicate the set condition of the first memory devices 300 by whether the corresponding lamps 30 are illuminated. The selection switches 302 and the indicating lamps 30 are associated with corresponding first memory devices 300 as indicated by suffixes *a, b, c*... . Start operation detecting diodes 304 are connected to the output terminals of the first memory devices 300, respectively, as indicated by suffixes *a, b, c* ... . When one of the selection switches 302 is actuated by the corresponding selection button 28, the corresponding first memory device 300 is set and the corresponding lamp 30 is illuminated. When said one of the selection switches 302 is actuated again, the corresponding first memory device 300 is reset and the corresponding lamp 30 is turned off. Said first memory devices 300 can be set by an odd number of operations of the selection buttons 28 and can be reset by an even number of operations of the selection buttons 28 because of the flip-flop action of the first memory devices 300. Each of the output terminals of said first memory devices 300 is also connected to a tray rotary switch 306. Referring to FIGS. 4 and 11, said tray rotary switch 306 is mounted on the middle chassis 48. A rotary shaft 308 of said switch 306 has a gear 310 secured thereto which meshes with the gear 93 affixed to the lower end of the shaft 78 of the pinion 94. While said pinion 94 is rotating the rotary tray 24, said rotary shaft 308 also rotates in association with the rotation of the rotary tray 24. When the rotary tray 24 makes a full rotation, said rotary shaft 308 also makes a full rotation. The tray rotary switch 306 has a plurality of radially extending contacts 314*a*, 314*b*, 314*c*... inside thereof, as shown in FIG. 11. The number of said contacts 314 is the same as that of the compartments 26 of the of the rotary tray 24. Said rotary shaft 308 has a rotary brush 316 secured thereto, which can make contact with each of said contacts 314 one by one. A slip contact 318 is constantly pressed against a lower edge portion of the rotary shaft 308 which acts as a common contact. As shown in FIG. 17, each of said contacts 314 is connected to a corresponding output terminal of one of the first memory devices 300.

The first memory devices 300 can be set only only by said selection devices, but by simultaneous setting means which will be described hereinafter. 320 is a simultaneous setting circuit for setting all of the first memory devices 300 at one time through each of the S terminals of said devices 300. Said simultaneous setting circuit 320 is actuated by a simultaneous setting switch 322 which can be operated by depression of the simultaneous setting button 36 in FIG. 1. The first memory devices 300 can also be reset by stop means which will be explained hereinafter. 324 is a resetting circuit for resetting all of the first memory devices 300 at one time through the R terminals of said devices 300. Said resetting circuit 324 is actuated by a stop switch 326 which can be operated by depression of the stop button 34 in FIG. 1. 328 is a stop memory which is composed of a flip-flop and memorizes the fact that said stop switch 326 is operated. A start set detecting gate 332 is supplied with the output of the first memory device 300 which is connected to the contact 314 which is contacted by the rotary brush 316.

This cassette changer is provided with cassette detecting means for detecting the presence of the single cassette 20 in a compartment 26 of the rotary tray 24. 334 is a cassette detecting device which is controlled by a cassette detecting switch 336. As shown in FIGS. 2 and 3, said switch 336 is mounted on the lower surface of the upper chassis 40. A cassette detecting lever 338 for actuating said switch 336 is pivotally mounted on a shaft 340 secured to the upper chassis 40. Said lever 338 has a roller 344 rotatably mounted at one end thereof which extends upward through an opening 342 in the upper chassis 40. Said roller 344 is inserted into an annular groove 348 formed in the lower periphery of the rotary tray 24 under the biasing force of a tension spring 346 which is attached to said cassette detecting lever 338. Said roller 344 engages the cassettes 20 stored in the compartments 36 during rotation of the rotary tray 24 and is pushed out from the annular groove 348. This causes the cassette detecting lever 338 to swing counterclockwise so that the end 350 of said lever 338 actuates the switch 336.

As shown in FIG. 2, since said roller 344 is disposed adjacent the opening 134 and the rotary tray 24 rotates in the direction of the arrow 130, said roller 344 detects the existence of a cassette 20 in the compartment 26 which is one pitch prior to the opening 134, while said compartment is brought to the first position just above the opening 134. When the existence of the cassette 20 is detected by said roller 344 and the switch 336 is actuated, the cassette detecting device 334 acts on the start set detecting gate 332 so as to send the output of the memory device 300 to a pulse shaper 352 through said gate 332. On the other hand, said start operation detecting diodes 304 are connected to a tray initiating controller 354. The output of said controller 354 is sent to a tray initiating gate 356.

The output terminal of said tray initiating gate 356 is connected to the solenoid 126. Said solenoid 126 is attached to the lower surface of the upper chassis 40 as shown in FIGS. 2 and 3. Upon energization of the solenoid 126, said solenoid 126 acts as a clutch to release the restriction of the movement of the rotary tray 24 by the index means and cause engagement of the motor 52 with the tray driving means.

On the other hand, the output of said pulse shaper 352 closes the tray initiating gate 356 so as to interrupt the passing of the output of the tray initiating controller 354 through said gate 356. The output of the pulse shaper 352 is delivered to an elevator initiating device 360 and is sent to an elevator initiating gate 362 from said device 360. The output terminal of the elevator initiating gate 362 is connected to the solenoid 160. Said solenoid 160 is attached to the middle chassis 48, as shown in FIGS. 3 and 4. Upon energization of said solenoid 160, the cam 170 is coupled with the motor 52 so as to initiate operation of the cassette exchanging means. Said elevator initiating gate 362 is connected to the switch 116 (in FIG. 2) which can be actuated by the lever 90. When the switch 116 is actuated by the lever 90 upon de-energization of the solenoid 126, the output of the elevator initiating device 360 is allowed to pass through the gate 362. Said gate 362 is also connected to the switch 244 for detecting when a single cassette 20 is completely engaged with the tape deck 136. Said switch 244 is actuated by the lever 230 in FIG. 4 upon clockwise swinging motion of the lever 230 after the single cassette 20 has been engaged with the tape deck 136. At that time, the elevator initiating gate 362 interrupts the passing of the output of the elevator initiating device 360. In spite of this condition, said gate 362 allows the output of said device 360 to pass through the gate 362 when the switch 298, FIG. 14, is actuated by detection of the tape end.

The output of the detector 358 is connected through a change-over switch 364 to a switching circuit 366 which works as resetting means for resetting the first memory devices 300. The output of said switching circuit 366 is connected to the rotary brush 316.

When the single cassette 20 is played back and returned to the rotary tray 24, the switch 248 is actuated, as stated above. Accordingly, the output of the detector 358 is sent to the switching circuit 366 so as to reset only one of the first memory devices 300 corresponding to the played single cassette 20 through the tray rotary switch 306.

When the operator depresses the simultaneous setting button 36 after all of the compartments 26 of the rotary tray 24 are filled up with the cassettes 20, the simultaneous setting switch 322 is closed to set all of the first memory devices 300. At that time, the output terminals of the first memory devices 300 are changed from zero voltage to a positive voltage, and actuate the tray initiating controller 354 through the start operation detecting diodes 304. Then the tray initiating controller 354 energizes the solenoid 126 through the tray initiating gate 356. Upon energization of said solenoid 126, the tray driving means rotates the rotary tray 24 in the direction of the arrow 130. At the same time, the lever 90 in FIG. 2 rotates clockwise to change the switch 116. Therefore, the elevator initiating gate 362 in FIG. 17 is closed to disengage the motor from the cassette exchanging means. If a single cassette 20 is stored in the compartment 26 which is being transferred to the first position just above the opening 134, said single cassette 20 actuates the switch 336 during rotation of said rotary tray 24 so that said switch 336 triggers the cassette detecting device 334 to produce a pulse of the required time length which makes the start set detecting gate 332 open. On the other hand, the rotary brush 316 of the tray rotary switch 306 is rotated until it contacts the contacts 314 which is connected to the output of the first memory device 300 corresponding to the compartment 26 which is transferred to the first position just above the opening 134 during rotation of the rotary tray 24. Since all of the first memory devices 300 are set as stated above, the positive voltage which is the output of one of the first memory devices 300 is sent to the pulse shaper 352 through the start set detecting gate 332 so as to produce an instruction pulse if the single cassette 20 is stored in the compartment 26 corresponding to one of said first memory devices 300. This instruction pulse is added to the tray initiating gate 356 as a trigger signal so as to cut off the current for the solenoid 126. Referring to FIG. 2, the lever 90 swings counterclockwise under the action of the tension spring 114 so that the roller 112 drops into the recess 96 of the rotary tray 24 so as to restrict the rotation of the rotary tray 24. At that time, the single cassette 20, the existance of which has been detected, occupies the first position just above the opening 134. At the same time, with the swinging motion of said lever 90, the tray driving means is disengaged from the motor and the switch 116 is actuated by the lever 90 so as to open the elevator initiating gate 362 in FIG. 17. Accordingly, the instruction pulse from the pulse shaper 352 is added to the elevator initiating device 360 and through the elevator initiating gate 362 energizes the solenoid 160 in FIGS. 4 and 10. Upon energization of said solenoid 160, the cassette exchanging means is coupled with the motor and the cam 170 rotates through the A-phase, B-phase and C-phase. With rotation of said cam 170, the cassette exchanging means transports the single cassette 20 from the rotary tray 24 and engages said single cassette 20 with the tape deck 136.

Figure 7:
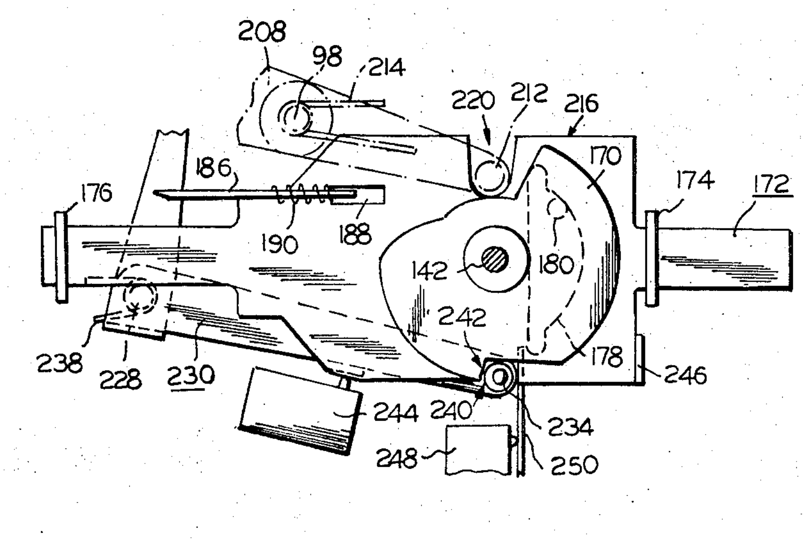

When the single cassette 20 is completely engaged with the tape deck 136, the lever 230 changes the switch 244 as shown in FIG. 7. Said switch 244 closes the gate 362 in FIG. 17 to deenergize the solenoid 160 so as to stop the operation of the cassette exchanging means.

The magnetic tape 284 in the single cassette 20, which is engaged with the tape deck 136 is moved by the tape moving elements and is played back by the magnetic head 264. The output of said head 264 is amplified by an amplifier 368 and sent to an output terminal 370.

After the termination of the playback of said single cassette 20, the switch 298 for detection of the tape end imparts a trigger signal to the gate 362 so as to open said gate 362. Thus, the solenoid 160 is energized to initiate the cassette exchanging means. When the cam 170 starts to rotate, as shown in FIG. 8, the switch 244 keeps the gate 362 in FIG. 17 open so that the cassette exchanging means transports the single cassette 20 upward to store it in the corresponding compartment 26 of the rotary tray 24. At that time, the resetting means in this cassette changer resets only the first memory device 300 corresponding to the played single cassette 20. When the single cassette 20 is returned to the rotary tray 24, the slide plate 172 actuates the switch 248 as shown in FIG. 5 so as to trigger the detector 358 in FIG. 17 so that the switching circuit 366 resets the flip-flop of the corresponding first memory device 300 which is connected to said switching circuit 366 through the tray rotary switch 306. Said detector 358 also resets the elevator initiating device 360 so as to deenergize the solenoid 160. Therefore, the cassette exchanging means is disengaged. Since the output of said detector 358 is also added to the tray initiating gate 356 to change said gate 356 to the open condition, the solenoid 126 is energized again to initiate the rotation of the rotary tray 24. At the same time, the switch 116 makes the elevator initiating gate 362 close to stop the operation of the cassette exchanging means. On the other hand, the output of said detector 358 resets the stop memory 328 through a switching circuit 327 at each termination of said operation of the cassette exchanging means.

The cassettes 20 in the rotary tray 24 are automatically and successively played back by repetition of the abovementioned operation cycle. In every said operation cycle, the flip-flop of the first memory device 300 corresponding to the played cassette 20 is reset and the indicating lamps 30 are turned off one by one. After the rotary tray 24 has made a full rotation and the last cassette 20 has been returned to the rotary tray 24, all of the first memory devices 300 are reset so that no instructions for a start operation are produced through the diodes 304. Therefore, the driving force of the motor 52 can be transmitted neither to the tray driving means nor to the cassette exchanging means, so that this cassette changer is brought to a stopped state.

Besides the above operation, this cassette changer has other functions which will be described hereinafter. Referring to FIG. 1, the operator can selectively set some of the first memory devices 300 by depressing the desired selection buttons 28. The operator can also selectively reset some of the first memory devices 300 corresponding to the cassettes 20 which the operator does not want to play back after setting all of the first memory devices 300 by depressing the simultaneous setting button 36. When the single cassette 20 in the compartment 26 corresponding to the first set memory device 300 is transferred to the first position just above the opening 134, said single cassette 20 is played back, as described above. However, even when the compartment 26 corresponding to the first memory device 300, which is not set, is transferred to said first position, the pulse shaper 352 does not have imparted thereto any variation of voltage level through the start set detecting gate 332, because the output voltage of the flip-flop of the corresponding first memory device 300 is zero. Accordingly, the rotary tray 24 continues its rotation so that said compartment 26 skips over the first position. As a result, the single cassette 20 in said compartment 26 is not played back.

If a single cassette 20 is not stored in the compartment 26, the switch 336 will not be actuated so that the cassette detecting device 334 does not open the start set detecting gate 332. At that time, even if the flip-flop of the corresponding first memory device 300 is set, the rotary tray 24 continues its rotation so that said compartment 26 skips over the first position.

By depression of the stop button 34 during the playback of the single cassette 20, the cassette changer can be brought to a stopped condition that will be described in more detail hereinafter. Said stop button 34 closes the stop switch 326 in FIG. 17 so that the resetting circuit 324 resets all of the set first memory devices 300 through their resetting terminals R. Therefore, no positive voltage is supplied to the tray initiating controller 354 thorugh the start operation detecting diodes 304. At the same time, the stop memory 328 is set by said stop switch 326. The output of said stop memory 328 is led to a stop controller 374. Upon setting the stop memory 328, said stop controller 374 opens the elevator initiating gate 362 so as to energize the solenoid 160. Then, the cassette exchanging means is initiated to return the single cassette 20 from the operative position to the first position in the rotary tray 24. At the end of said operation, the switch 248 triggers the detector 358 so that the switching circuit 372 resets the stop memory 328. At the same time, said detector 358 also resets the elevator initiating device 360. As a result, all of the first memory devices 300, the stop memory, and the elevator initiating device 360 are reset, and the tray initiating controller 354 stops its operation. Thus, the rotation of the rotary tray 24 and the exchanging operation of the cassette exchanging means are stopped completely.

This cassette changer can also play back all of the cassettes 20 stored in the rotary tray 24 endlessly, as will be described hereinafter.

This cassette changer is provided with actuating means for setting all of the first memory devices 300 at one time in association with the rotation of the rotary tray 24 at least once during one rotation of said rotary tray 24. With reference to FIGS. 2 and 3, a switch 376 is attached to the lower surface of the upper chassis 40 in the vicinity of the central portion of the rotary tray 24. A switch lever 378 is pivotally mounted on a shaft 380 secured to the upper chassis 40 and is swung counterclockwise by a tension spring 382. Therefore, said switch lever 378 does not usually actuate said switch 376. Said switch lever 378 has a bent portion 386 formed at one end thereof which extends upwardly through an opening 384 of the upper chassis 40. Said bent portion 386 can be engaged with two pins 388 which are secured to the lower surface of the rotary tray 24 during the rotation of said rotary tray 24. Said pins 388 swing the switch lever 378 clockwise so as to actuate said switch 376.

Figure 17:
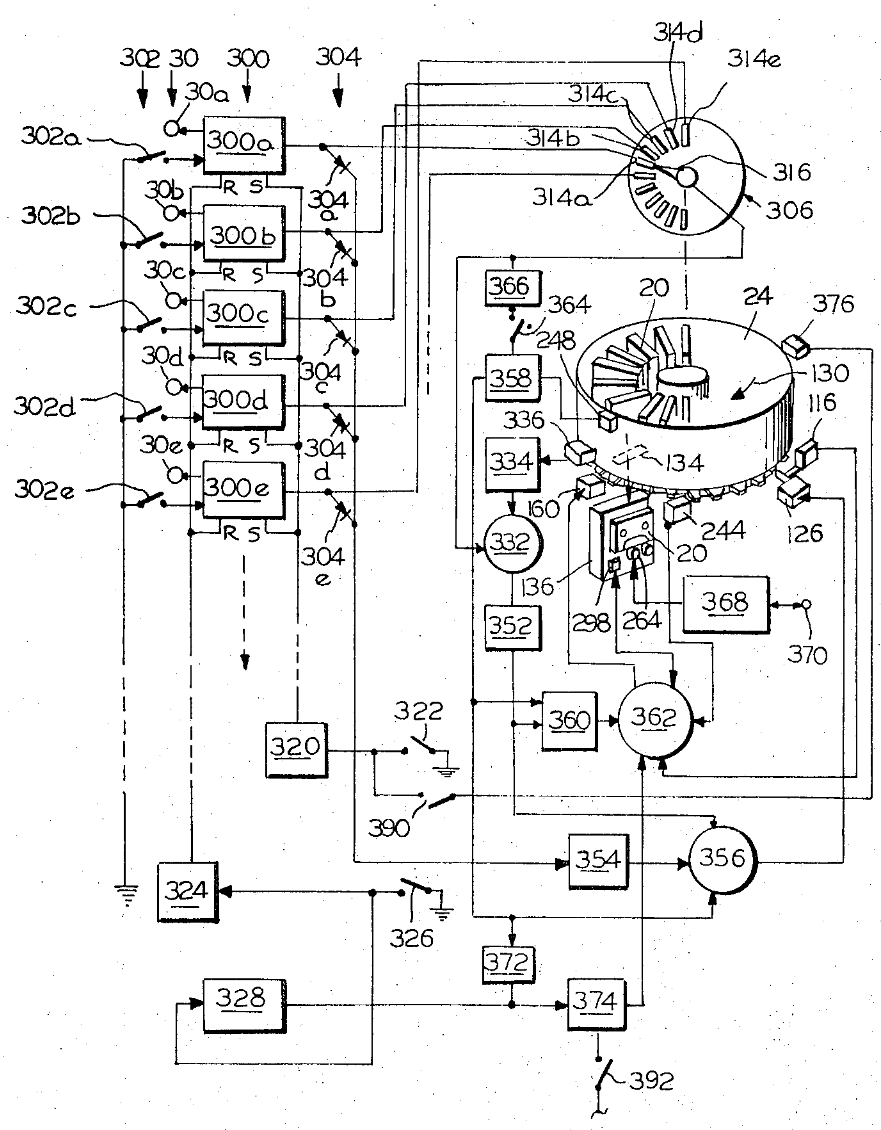
FIG. 17 is a diagrammatic illustration of one embodiment of the electrical control circuits in this automatic cassette changer.

If the operator wants to play back the cassettes endlessly, the operator turns the switch knob 38 in FIG. 1 to change a switch 390 in FIG. 17 before operation of this cassette changer so that the switch 376 is connected to the simultaneous setting circuit 320. Upon operation of the simultaneous setting switch 322, the cassette changer starts to play back the cassettes 20 successively. As stated above, the flip-flops of the first memory devices 300 are reset one by one in every cassette exchanging cycle. Before all of the first memory devices 300 are reset during one rotation of the rotary tray 24, the pins 388 secured to the lower surface of the rotary tray 24 actuate the switch 376 at least once during one rotation of the rotary tray 24. At that time, all of the first memory devices 300 are set through the simultaneous setting circuit 320. Accordingly, the rotary tray 24 does not stop after one rotation thereof and continues its rotation for successive playback of the cassettes 20 endlessly. In this case, the indicating lamps 30 are turned off one by one according to the reset of the corresponding first memory devices 300. Therefore, the operator can recognize the cassette 20 played back by watching the lamps 30.

On the other hand, another method to achieve endless playback of the cassettes is to open the change-over switch 364. Since the signal from the detector 358 is not added to the switching circuit 366, the respective first memory devices 300 are not reset after the termination of the playback of the corresponding single cassette 20 so that all cassettes 20 are played back endlessly. In this case, only the desired cassettes 20 corresponding to the first memory devices 300 which are set by the selection switches 302 can be endlessly played back. The operator can stop endless playback of the cassettes 20 by resetting the corresponding first memory devices 300 by depression of the selection buttons 28.

By depression of the reject button 32 in FIG. 1 during the playback of a single cassette 20, said single cassette is returned to the rotary tray 24 and the next single cassette is engaged with the tape deck 136. Said reject button 32 closes a switch 392 in FIG. 17 to actuate the stop controller 374 so as to open the elevator initiating gate 362. Therefore, the solenoid 160 is energized to initiate the cassette exchanging means. The single cassette 20 is immediately returned to the rotary tray 24 and the next single cassette 20 corresponding to the set first memory device 300 is transferred to the first position and is introduced to the operative position for the playback of said next single cassette 20.

Figure 18:
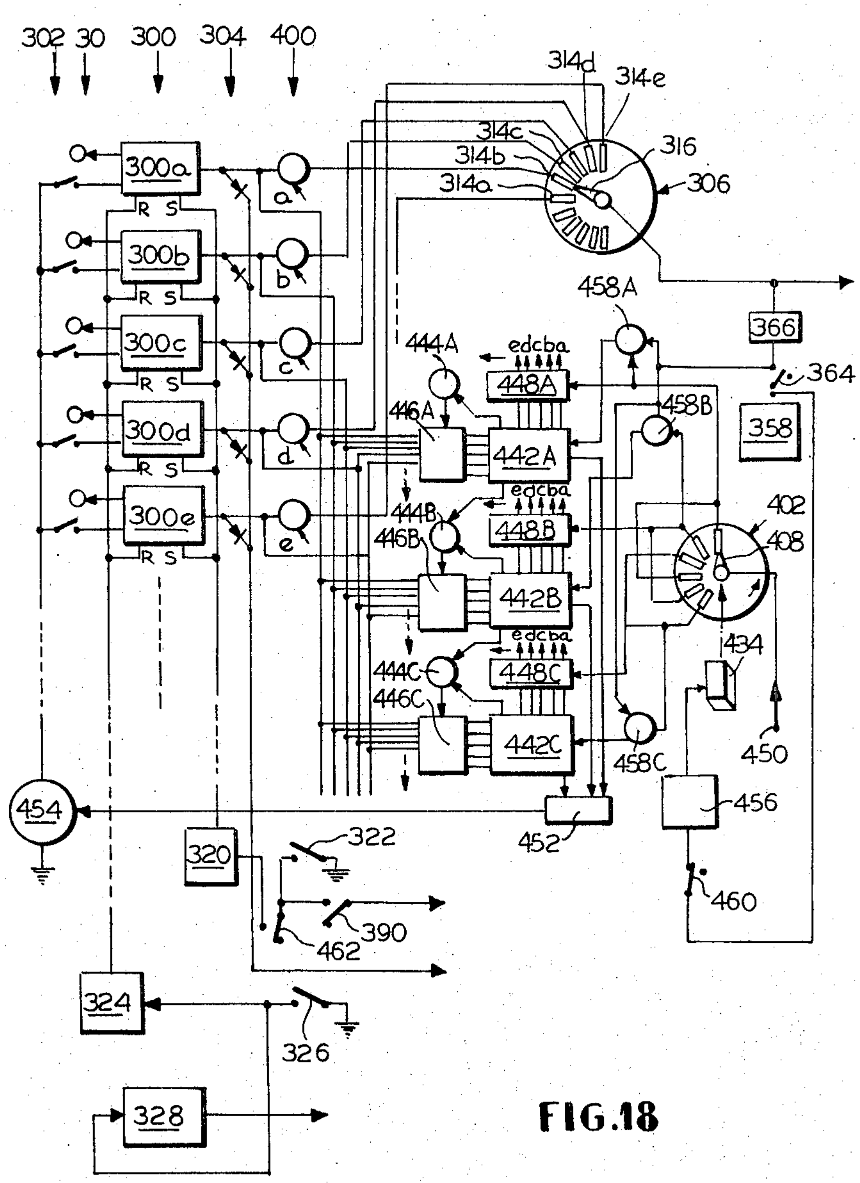
FIG. 18 is a diagrammatic illustration of another embodiment of the electrical control circuits in this automatic cassette changer.

With reference to FIG. 18, another embodiment of the control circuits for the cassette changer will be described hereinafter. In this embodiment, the desired cassettes 20 are played back in a selected order. Since the basic construction of the embodiment in FIG. 18 is substantially the same as that in FIG. 17, only the added structure and operation will be explained.

Figure 16:
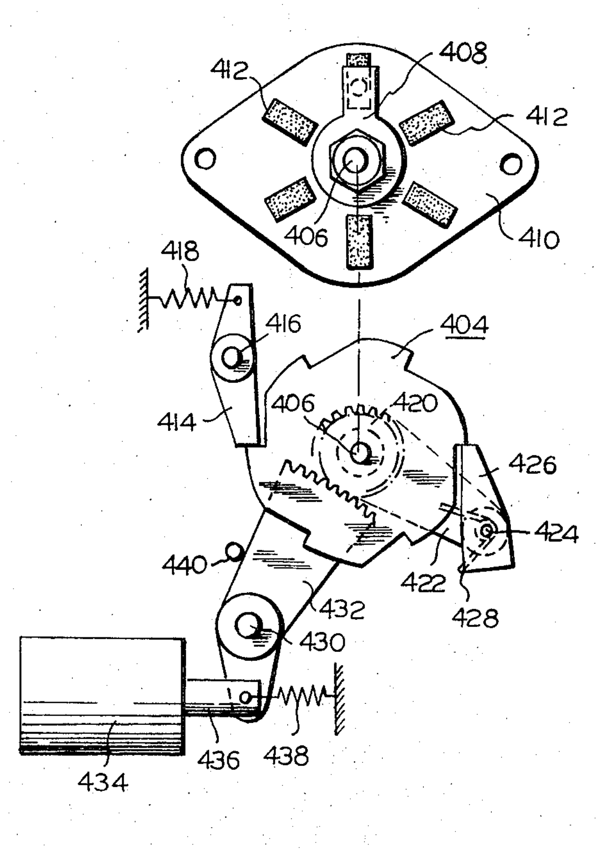
FIG. 16 is a fragmentary view of a memory step switch used in this automatic cassette changer.

A plurality of selection order instruction gates 400 is provided between the first memory devices 300 and the corresponding contacts 314 of the tray rotary switch 306. A memory step switch 402, the construction of which is as shown in FIG. 16, is also provided. A ratchet wheel 404 is fixed to a rotatable shaft 406 to which a rotary brush 408 is also attached. Said rotary brush 408 can engage with each of a plurality of contacts 412 which are formed on a wafer 410. A latch member 414 is pivotally mounted on a shaft 416 and is biased clockwise by a tension spring 418. Said latch member 414 restricts the clockwise rotation of the ratchet wheel 404. A lever 422 having a gear 420 secured thereto is rotatably mounted on said shaft 406. A claw 426 is pivotally mounted on a shaft 424 which is secured to one end of the lever 422. Said claw 426 is engaged with the periphery of the ratchet wheel 404 under the counterclockwise biasing force of a torsion spring 428. Said gear 420 meshes with a sector gear 432 which is pivotally mounted on a shaft 430. One end of said sector gear 432 is linked with a plunger 436 of a solenoid 434. Said sector gear 432 is biased counterclockwise by a tension spring 438 so as to be pressed against a pin 440. Upon energization of the solenoid 434, the plunger 436 is pulled to rotate the sector gear 432 clockwise. Therefore, the lever 422 swings counterclockwise so that the claw 426 drives the ratchet wheel 404 counterclockwise one pitch thereof. This rotation of the ratchet wheel 404 causes the rotary brush 408 to index one pitch thereof so as to contact the next contact 412. Upon deenergization of the solenoid 434, the sector gear 432 is rotated counterclockwise by the tension spring 438 to return to its initial position. Accordingly, the lever 422 rotates clockwise to return to its initial position. Thus, the ratchet wheel 404 is intermittently rotated by one pitch upon every energization of the solenoid 434 and the rotary brush 408 is rotated so as to contact with each of the contacts 412 one by one.

In FIG. 18, second memory devices 442 are provided which consist of three series 442A, 442B and 442C in this embodiment. Selection order memory gates 444 and input gates 446 are also provided, each of which can set a corresponding second memory device 442 to memorize a code corresponding to the number of the selectively set first memory devices 300. These input gates 446 are designated by a suffix A, B or C corresponding to the second memory devices 442. Diode matrixes 448 are provided which make the number of the cassette which is memorized by the second memory device 442 to correspond to one of the first memory devices 300. The output of each of the diode matrixes 448A, 448B and 448C is connected to each of the selection order instruction gates 400. A positive voltage is supplied to the rotary brush 408 of the memory step switch 402 from an input terminal 450. 452 is a detector for detecting whether all of the second memory devices 442 are set or not. When the second memory devices 442 are all set, an overflow check gate 454 prevents the first memory devices 300 from being reset by the output of the detector 452. The solenoid 434 is energized by a driving circuit 456. 458 is a gate for resetting said second memory devices 442. The control circuits of this embodiment can be changed from a successive operation mode, as shown in FIG. 17, to a random selecting operation mode, as shown in FIG. 18, by switches 460 and 462, which are operated by turning of the switch knob 38 in FIG. 1.

Before operation of this cassette changer, the rotary brush 408 of the memory step switch 402 is placed in the position as shown in FIG. 18 so as to connect the input terminal 450 to the diode matrix 448A associated with the second memory device 442A. The selection order memory gate 444A is open when the second memory device 442A is not set so that the input gate 446A is also opened through said gate 444A. If one of the first memory devices 300 is set by operation of the selection switch 302, the output of said first memory device 300 is added to the second memory device 442A through the input gate 446A so that said second memory device 442A memorizes a code corresponding to a number of the selected first memory device 300. Upon setting of the first memory device 300, the positive voltage is supplied to the tray initiating controller 354 (see FIG. 17) through the diode 304 so that selected cassette 20 is played back.

When the second memory device 442A is set and the second memory device 442B is not set, the selection order memory gate 444B is open so as to open the input gate 446B. When another one of the first memory devices 300 is set by operation of the selection switch 302, the output of said first memory device 300 is added to the second memory device 442B through the input gate 446B so that said second memory device 442B memorizes another code corresponding to said another one of the selected first memory device 300. In this manner, the second memory devices 442 can be set one by one under control of the selection order memory gates 444. When all of the second memory devices 442 are set, the overflow check gate 454 invalidates the operation of the selection switch 302 so that the first memory devices 300 will not be set any more.

Since the rotary brush 408 of the memory step switch 402 is supplied with positive voltage from the terminal 450, the voltage of one terminal of the second memory device 442 corresponding to the number of the cassette which is memorized by said second memory device 442 is changed so as to be positive so that one of the selection order instruction gates 400 corresponding to the selected cassette is open. Since the first memory device 300 corresponding to said open gate 400 has been necessarily set, the output of said first memory device 300 is added to the start set detecting gate 332 (in FIG. 17) through the tray rotary switch 306. The single cassette 20 corresponding to said set first memory device 300 is now played back. However, the output of other set first memory device 300 cannot be added to said gate 332.

After the playback of said signal cassette 20, the detector 358 is actuated as described above so as to reset the flip-flop of said first memory device 300 which is connected to the switching circuit 366 through the tray rotary switch 306 and the selection order instruction gate 400, if the changeover switch 364 is closed. At the same time, the second memory device 442A is reset by the detector 358 through the opened gate 458A which is supplied with positive voltage from the memory step switch 402. The output of the detector 358 is added to the driving circuit 456 through the switch 460. Then, the solenoid 434 is energized to shift the rotary brush 408 of the memory step switch 402 to a position indicated by B. Thus, the next second memory device 442B is connected to the input terminal 450 through the memory step switch 402. Accordingly, the next selected cassette 20 corresponding to said second memory device 442B is played back. In such a manner, the cassettes 20 are automatically played back in a selected order by depression of the selection buttons 28.

When the second memory devices 442 are reset, the selection order memory gates 444 are opened so as to allow the reset second memory devices 442 to be set in a new selection order through input gates 446.

When all of the first memory devices 300 and all of the second memory devices 442 are reset, this cassette changer stops its operation.

In the above described embodiment of the automatic cassette changer, a plurality of cassettes are played back successively and selectively. By adding a recording amplifier which can be connected to the magnetic head of the tape deck, a plurality of cassettes can be recorded automatically. These modifications can be easily achieved in the automatic cassette changer according to the present invention.

It is apparent that various modifications may be made without departing from the substantial properties in the invention. The above described specific examples are intended merely to illustrate the various inventive facts in certain selective embodiments of the invention, the scope of which it is intended shall be limited only by the following claims.

What is claimed is:

1. An automatic cassette changer comprising:

a chassis;

a rotary tray which is rotatably mounted on said chassis and has a plurality of compartments for storing a plurality of cassettes;

a tape deck mounted on said chassis and having a magnetic head and tape moving means for playback of said cassettes;

tray driving means coupled to said rotary tray for rotating said rotary tray to transfer said cassettes along a circular path;

index means engageable with said rotary tray for restricting the rotation of said rotary tray so as to position a selected compartment of said rotary tray at a first position where a single cassette in said selected compartment can be introduced toward said tape deck;

cassette exchanging means on said chassis at said first position and movable for transporting said single cassette from said first position to an operative position to engage said single cassette with said tape deck so that said single cassette is played back by said magnetic head;

a motor for driving said tray driving means and said cassette exchanging means;

clutch means connected between said motor and said tray driving means and said cassette exchanging means and coupled to and responsive to said index means upon restriction of said rotary tray by said index means so as to disengage said motor from said tray driving means and to engage said motor with said cassette exchanging means so that said single cassette is transported from said first position to said operative position by said cassette exchanging means;

a plurality of first memory devices, each of which corresponds to one of said compartments of said rotary tray for memorizing instructions to play back a single cassette in the corresponding compartment;

simultaneous setting means coupled to said first memory devices for setting all of said first memory devices at one time to memorize said instructions;

control means coupled between said memory devices and said tray driving means and said index means for controlling said tray driving means and said index means for causing said tray driving means to rotate said rotary tray and said index means to restrict the rotation of said rotary tray so as to bring a single cassette in the compartment corresponding to the set first memory device to said first position when at least one of said first memory devices is set by said simultaneous setting means; and resetting means coupled to said first memory devices for resetting said set first memory devices corresponding to the single cassette played during each exchanging cycle of said cassette exchanging means.

2. An automatic cassette changer as claimed in claim 1 further comprising actuating means coupled to said first memory devices for setting all of said first memory devices at one time to memorize said instructions in association with the rotation of said rotary tray at least once during one rotation of said rotary tray, whereby said rotary tray rotates endlessly to play back all of said cassettes repeatedly regardless of the resetting of each first memory device by said resetting means in each exchanging cycle of said cassette exchanging means.

3. An automatic cassette changer as claimed in claim 1 further comprising a plurality of selection devices, each connected to each of said first memory devices and which are capable of selectively resetting said first memory devices corresponding to the cassettes which are not desired to be played back, whereby only desired cassettes are played back upon operation of said selection devices after all of said first memory devices have been set by said simultaneous setting means.

4. An automatic cassette changer comprising:

a chassis;

a rotary tray which is rotatably mounted on said chassis and has a plurality of compartments for storing a plurality of cassettes;

a tape deck mounted on said chassis and having a magnetic head and tape moving means for playback of said cassettes;

tray driving means coupled to said rotary tray for rotating said rotary tray to transfer said cassettes along a circuilar path;

index means engagable with said rotary tray for restricting the rotation of said rotary tray so as to position a selected compartment of said rotary tray at a first position where a single cassette in said selected compartment can be introduced toward said tape deck;

cassette exchanging means on said chassis at said first position and movable for transporting said single cassette from said first position to an operative position to engage said single cassette with said tape deck so that said single cassette is played back by said magnetic head;

a motor for driving said tray driving means and said cassette exchanging means;

clutch means connected between said motor and said tray driving means and said cassette exchanging means and coupled to and responsive to said index means upon restriction of said rotary tray by said index means so as to disengage said motor from said tray driving means and to engage said motor with said cassette exchanging means so that said single cassette is transported from said first position to said operative position by said cassette exchanging means;

a plurality of first memory devices, each of which corresponds to one of said compartments of said rotary tray for memorizing instructions to play back a single cassette in the corresponding compartment;

a plurality of selection devices, each of which corresponds to and is coupled to one of said first memory devices and which are capable of setting said first memory devices selectively to memorize said instructions;

control means coupled between said first memory devices and said tray driving means and said index means for controlling said tray driving means and said index means for causing said tray driving means to rotate said rotary tray and said index means to restrict the rotation of said rotary tray so as to bring a single cassette in the compartment corresponding to the set first memory device to said first position when at least one of said first memory devices is set by the corresponding selection device; and resetting means coupled to said first memory devices for resetting the set first memory devices corresponding to the single cassette played during each exchanging cycle of said cassette exchanging means.

5. An automatic cassette changer as claimed in claim 4 wherein said selection devices include means for resetting said first memory devices selectively to cancel said instructions.

6. An automatic cassette changer as claimed in claim 5 further comprising switching means coupled to said first memory devices and to said control means for resetting all of the first memory devices which memorize said instructions and for instructing said control means to operate said cassette exchanging means to return the single cassette from said operative position to said first position so that the automatic cassette changer is brought into the stopped condition after said single cassette has been restored to the compartment of said rotary tray.

7. An automatic cassette changer comprising:

a chassis;

a rotary tray which is rotatably mounted on said chassis and has a plurality of compartments for storing a plurality of cassettes;

a tape deck mounted on said chassis and having a magnetic head and tape moving means for playback of said cassettes;

tray driving means coupled to said rotary tray for rotating said rotary tray to transfer said cassettes along a circular path;

index means engageable with said rotary tray for restricting the rotation of said rotary tray so as to position a selected compartment of said rotary tray at a first position where a single cassette in said selected compartment can be introduced toward said tape deck;

cassette exchanging means on said chassis at said first position and movable for transporting said single cassette from said first position to an operative position to engage said single cassette with said tape deck so that said single cassette is played back by said magnetic head;

a motor for driving said tray driving means and said cassette exchanging means;

clutch means connected between said motor and said tray driving means and said cassette exchanging means and coupled to and responsive to said index means upon restriction of said rotary tray by said index means so as to disengage said motor from said tray driving means and to engage said motor with said cassette exchanging means so that said single cassette is transported from said first position to said operative position by said cassette exchanging means;

a plurality of first memory devices, each of which corresponds to one of said compartments of said rotary tray for memorizing instructions to play back a single cassette in the corresponding compartment;

a plurality of selection devices, each of which corresponds to and is coupled to one of said first memory devices and which is capable of setting said first memory devices selectively to memorize said instructions;

a plurality of second memory devices coupled to each of said first memory devices for memorizing the order in which said first memory devices have been set, a memory step switch coupled to each of said second meory devices for controlling said second memory devices during every exchanging cycle of said cassette exchanging means so as to allow only one of the set first memory devices corresponding to the number memorized by the second memory device to initiate said index means; and control means coupled between said second memory devices and said tray driving means and said index means for controlling said tray driving means and said index means for causing said tray driving means to rotate said rotary tray and said index means to restrict the rotation of said rotary tray so as to bring the single cassette in the compartment corresponding to the set first memory device to said first position when at least one of said first and second memory devices is set by the corresponding selection device; whereby said cassettes are played back in the order in which said first memory devices have been set by said selection devices.

8. An automatic cassette changer as claimed in claim 7 further comprising resetting means coupled to said first and second memory devices for resetting the first memory devices and the corresponding second memory devices during every exchanging cycle of said cassette exchanging means, whereby said cassette changer stops its operation when all of said first and second memory devices have been reset.

* * * * *